Aug. 20, 1963  E. R. KALIS  3,101,065
REINFORCED PLASTIC DIE
Filed June 16, 1958  2 Sheets-Sheet 1

INVENTOR.
Edward R. Kalis
BY
J. N. Shanefo
ATTORNEY

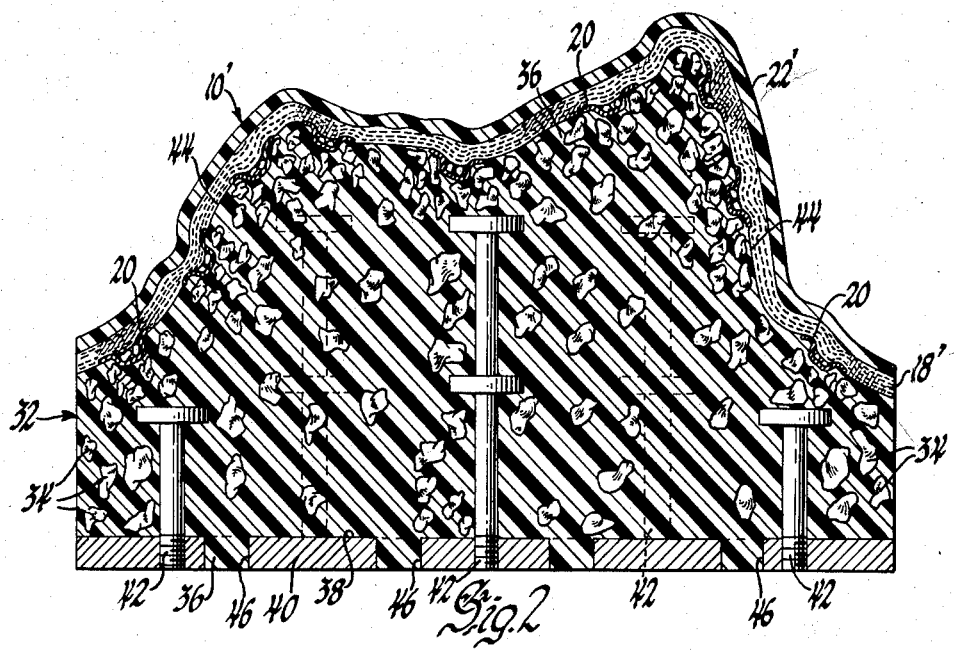
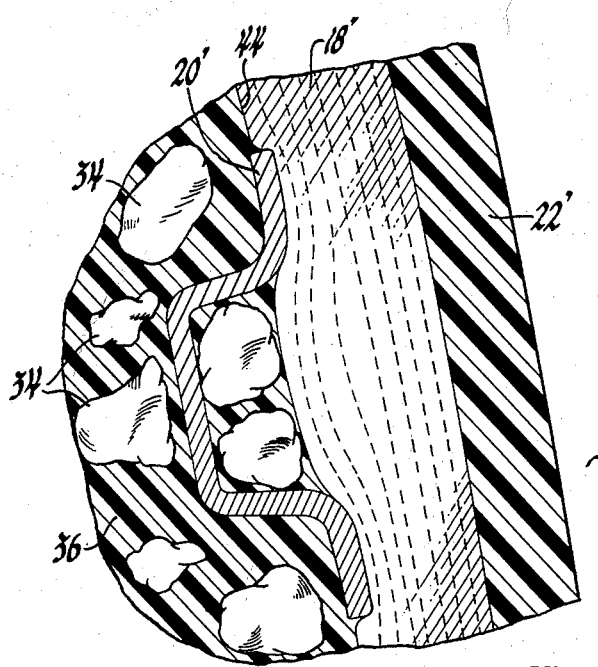

United States Patent Office 3,101,065
Patented Aug. 20, 1963

3,101,065
REINFORCED PLASTIC DIE
Edward R. Kalis, Dearborn, Mich., assignor to General Motors Corporation, Detroit, Mich., a corporation of Delaware
Filed June 16, 1958, Ser. No. 742,362
6 Claims. (Cl. 113—49)

This invention relates to a reinforced plastic die for use in sheet metal stamping and punching operations and to a process for making the same. More particularly, the present invention pertains to a composite stamping die having its contoured working portion formed of a plurality of filled or reinforced epoxy resin layers which are supported by a metal backing member.

The present disclosure is a continuation-in-part of my co-pending United States patent application Serial No. 614,117, now abandoned, which was filed on October 5, 1956, and assigned to the assignee of the instant patent application.

The cost of tooling for the manufacture of stamped metal parts has always been very high chiefly because of the expense of the all-metal stamping dies in common use. As is well known, conventional matched metal dies for stamping or punching operations must be contoured extremely accurately and thus require considerable machining. The high cost of such tooling is particularly significant in the automobile industry since frequent model changes necessitate a complete re-tooling program at relatively short intervals. Very often the expense of producing a low volume production model is prohibitive because of these tooling costs.

Accordingly, it is a principal object of this invention to solve the above-outlined problem by providing a relatively inexpensive reinforced plastic stamping or punching die which is not only durable but which is capable of producing sheet metal parts having the high quality and accuracy of those formed by conventional all-metal dies.

These and other objects are attained in accordance with the present invention with a composite die, the body portion of which is partially formed with a cast filled epoxy resin. The cast filled epoxy resin forms a backing for a plurality of layers of epoxy resin which is reinforced with fiber glass cloth. The fiber glass epoxy resin laminate in turn comprises a backing for a filled epoxy resin which forms a working surface on the die.

Other objects and advantages of this invention will more fully appear from the following detailed description of a preferred embodiment thereof, reference being made to the accompanying drawings, in which:

FIGURE 2 is a similar view showing a modification of the male die member shown in FIGURE 1; and FIGURE 3 is an enlarged fragmentary sectional view of a surface portion of the die shown in FIGURE 2.

Figure 1:
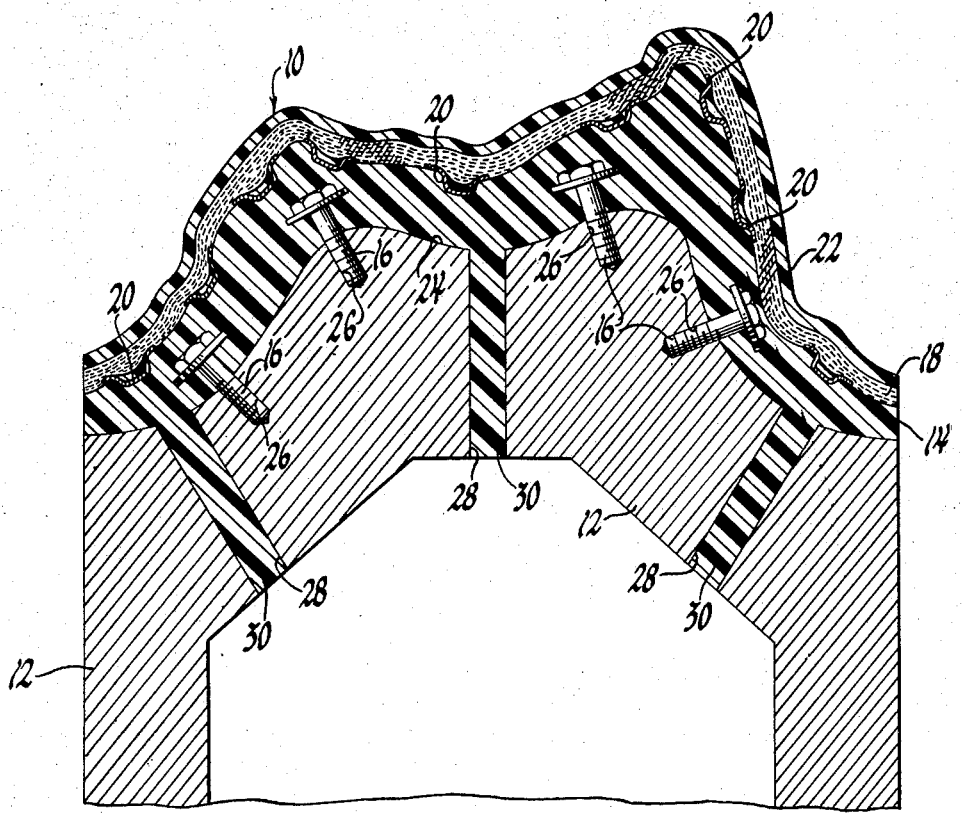
FIGURE 1 is a cross sectional view showing a male die member formed in accordance with the invention.

Referring more particularly to the drawings, in FIGURE 1 there is shown a stamping or drawing die 10 having a contoured metal base member 12. This base may be formed of any strong metal, but steel or semi-steel castings are preferred from the standpoint of economy and strength.

A thick layer 14 of filled epoxy resin, which is bonded to the upper surface of the metal casting or base 12, is the principal contour-forming portion of the die. This epoxy resin layer is also attached to the metal base by means of anchor bolts 16. The outer surface of the layer 14 is covered with an adhering laminate 18 formed of fiber glass cloth impregnated with epoxy resin. A plurality of bridge chaplets 20 of generally U-shaped cross section are provided at the interface of the filled epoxy resin layer 14 and the fiber glass cloth-epoxy resin laminate 18. These chaplets, which are preferably formed of metal screening, are spaced apart so as to best aid in securing the layer 14 to the laminate. In the embodiment of the invention shown in the drawings, a die surface coat 22 is provided over the outer surface of the epoxy resin-impregnated fiber glass cloth laminate. This surface coat, which likewise is composed of filled epoxy resin, is the only portion of the die which contacts the sheet metal panel to be formed during the stamping or drawing operation.

In making the die described above a male wood model having a surface corresponding to the contour of the sheet metal to be stamped is first constructed. Where necessary, plaster, wood or clay may be added in small amounts to the face of the model so that the resultant surface corresponds to the shape of the die to be formed. In this manner provision may be made for clearance, runoff, flares, etc., which are present in the die.

A layer of hard wax having the same thickness as the sheet metal to be stamped is thereafter applied to the surface of the model, and a female plaster cast is made from it. The hardened plaster cast and the wax, which adheres to it, are removed from the model, and a second female plaster cast is subsequently taken from the bare wood of the model. Next a male plaster cast is made from the second female cast, and the latter is discarded. The working surfaces of both the male and female plaster casts are preferably then sealed by rubbing them with paste wax followed by a coat of liquid wax. After the wax has dried to a hardened condition, powdered mica is dusted on the surfaces of the casts and the excess mica removed.

Wood or plaster damming is next fitted to the periphery of each plaster cast in order to properly isolate and distribute the plastic to be poured. While the process for forming my new reinforced die is hereinafter described in terms of the male die shown in the drawing, it will be understood, of course, that a similar procedure is employed for producing the mating female die.

The face coat or die surface layer 22 of quartz-filled epoxy resin is then brushed on the surface of the female plaster cast being treated. It is preferable to apply at least one more coat of the same material while the first coat is still tacky. A resin containing about 20% to 70% by weight of quartz or the like, together with 6% to 15% by weight of a catalyst or hardener, has been found to be satisfactory. An example of a filled epoxy resin which is suitable for this purpose is Hysol TC-5562 currently manufactured by Houghton Laboratories, Inc. of Olean, New York. The hardener sold under the designation "TH-4D" by the same company may be satisfactorily used as the catalyst.

Next a tailored piece of untreated fiber glass cloth which has been impregnated with epoxy resin is applied to the face coat or die working surface 22 while the latter is still in a tacky condition. Excellent results have been obtained with an impregnating material consisting of 50% to 75% by weight of epoxy resin, 10% to 30% by weight of silica flour and 8% to 20% by weight of hardener.

The epoxy resin-impregnated cloth may be applied to the aforementioned die surface coat or face coat 22 without the benefit of fillets. However, all air pockets should be worked out of the glass fiber cloth so that it is in intimate contact with the face coat. The epoxy resin in the impregnated fiber glass cloth layer should be allowed to cure until it is hard, and the procedure is preferably repeated until a multiplicity of such layers have been built up on the face coat. It is normally desirable to employ twelve to eighteen layers of the impregnated fiber glass cloth. A curing time of one hour to three hours for each layer has been found satisfactory. However, before the final layer is hard, it is advantageous to insert the bridge chaplets 20 against or in the outer layer of impregnated cloth to act as anchors between the formed laminate 18 and the filled epoxy resin backing 14 which is subsequently cast into contact with the laminate.

The semi-steel body portion or base 12 of the die is cast and machined. Next the area 24 against which the epoxy resin backing layer 14 is to be cast is ground or sand blasted to improve adhesion of the plastic to the metal. This surface of the semi-steel casting is relieved below the contour of the finished die surface a distance, usually one inch to 1¾ inches, equal to the total thickness of the layers 14, 18 and 22. Holes 26 are thereafter drilled and tapped in the ground or sand blasted surface of the metal casting, and a plurality of bolts 16 are threaded into these holes, as shown in the drawing, to help anchor the plastic to the casting. Of course, headed pins welded to the surface 24 may be employed instead of bolts. Vent holes 28 of appropriate size are also drilled through the cast metal base 12 in order to prevent trapping of air during the casting of the filled epoxy layer 14 between the laminate 18 and the metal base.

The ground or sand blasted surface 24 of the semi-steel casting or base 12 is cleaned by wiping with a solvent, such as alcohol, to remove oil or grease which would interfere with adhesion of the epoxy resin to the metal. A face coat of epoxy resin is then brushed on the metal surface 24 against which the plastic will be cast to provide a sound bond between these components of the die. This face coat, which may be of the same composition as that used in impregnating the fiber glass cloth, is allowed to cure until tack-free. Normally a curing period of 1½ hours to 2½ hours is sufficient.

After this epoxy resin face coat has cured, the prepared semi-steel casting or body portion 12 of the die is inverted, supported on leveling jacks, and clamped to prevent it from moving. The above-described female plaster cast is then located under the metal body portion and held in place temporarily with leveling jacks. C-clamps may be fastened to a clamping flange on the body portion of the die, and hemp saturated with plaster can be threaded through the throats of these clamps. Thereafter air vent boxes are positioned over the vent holes 28 drilled through the metal body, and pouring spouts are attached to the plaster cast. Plaster-saturated hemp can be used to seal the joint where the plaster cast meets the metal body, as well as all joints where pouring spouts or vent boxes are attached.

When the female plaster cast and the metal body portion or base 12 of the die are thus assembled, the surface 24, which is provided with the aforementioned cured face coat of epoxy resin, constitutes the top wall of a cavity into which the plastic material is poured, while the inner surface of the plaster cast defines the bottom wall. The filled epoxy resin which forms the thick backing layer 14 is next poured in the spouts at the lowest point until the level of the plastic rises and fills all air vents 28. The resultant fingers 30 of filled epoxy resin which extend through these vents further aid in securing the layer 14 to the metal base 12. This pouring operation should be performed slowly to allow the air to properly escape through the vents and hence prevent entrapment of any substantial amount of air.

It has been found desirable to allow the filled epoxy resin layer 14 to cure for at least 24 hours before removing the female plaster cast. After the flash is machined off in any suitable manner, the composite die is complete and is ready for use. This die and the mating female die, which may also be formed in the foregoing manner, are then set up in assembled position for drawing operations.

I have found it advantageous to form the plastic layer 14 of an epoxy resin containing an appropriate filler such as Portland cement. A satisfactory mixture is one comprising about 25% to 40% by weight of epoxy resin, 10% to 20% by weight of atomized aluminum or other suitable metal powder, 40% to 60% by weight of Portland cement, and 2% to 10% by weight of catalyst or hardener. Specifically, excellent results are obtained with a composition consisting of approximately 100 parts by weight of epoxy resin, 150 parts by weight of Portland cement, 50 parts by weight of atomized aluminum, and about 10 parts by weight of hardener. Among the powdered metals which may be used, atomized aluminum having a mesh size of approximately 120 has been found to provide excellent results.

Referring now to the modification of my invention shown in FIGURE 2, there is shown a stamping or drawing die 10' having a body portion 32 formed of a mixture of small stones 34 throughout the interstices of which a filled epoxy resin 36 is cast. This body portion 32 of filled epoxy resin 36 and stone 34 is bonded to the surface 38 of a flat metal plate 40 and comprises the principal contour-forming portion of the die. A plurality of anchor members 42, which threadedly engage the flat metal plate 40, extend therefrom into the stone-filled epoxy resin mixture and aid in securing the die to the plate. The outer surface 44 of the stone-filled epoxy resin body portion of the die is covered with an adhering laminate 18' formed of fiber glass cloth which is impregnated with an epoxy resin. A plurality of bridge chaplets 20' of generally U-shaped cross section, more clearly shown in FIGURE 3, are provided at the interface of the filled epoxy resin stone body portion 32 and the fiber glass cloth-epoxy resin laminate 18'. These chaplets, which are preferably formed of metal screening, are spaced apart so as to best aid in securing the laminate 18' to the body portion 32 of the die. In the present embodiment of my invention, as in the previously described embodiment shown in FIGURE 1, a die surface coat or face coat 22' is provided over the outer surface of the resin impregnated fiber glass cloth laminate 18'. This surface coat, which likewise is composed of filled epoxy resin, is the only portion of the die which contacts the metal panel to be formed during the stamping or drawing operation.

FIGURE 3 more clearly shows the surface regions of a composite die formed in accordance with my invention, specifically showing the nature of the bridge chaplets 20' in connection with the modification shown in FIGURE 2.

In making a male and female die of the character just described, plaster casts are made from a male wood model having a surface corresponding to the sheet metal to be stamped and are prepared, as hereinbefore described. Wood or plaster damming is then fitted and sealed to the periphery of each plaster cast forming a casting cavity in order to properly isolate and distribute the plastic which is to be poured.

While the process for making this modification of my invention is hereinafter described in terms of the male die shown in FIGURE 2, it will be understood as in the discussion of the previous modification that a similar procedure is employed for producing the mating female die.

After the damming is fitted to the femal plastic cast, its working surface is sealed with wax, as described previously. It is sometimes desirable to also form a surface on the side walls of the die similar to the construction of the working surface. In such instances it is also desirable to wax the surfaces of the damming defining the casting cavity. A face coat 22' or die surface layer of the hereinbefore described quartz-filled epoxy resin is put on the waxed or sealed surfaces. As in the previous modification, it is preferable to apply at least one more coat of this material while the first is still tacky. Should a thicker face coat be desired than that attained with these two applications of quartz-filled epoxy resin, additional layers can be applied, preferably while the immediately underlying layer is still tacky.

Next a tailored piece of untreated fiber glass cloth which has been impregnated with epoxy resin is applied to the inner surface of the face coat while the latter is still in a tacky condition. As in the previous modification, excellent results have been obtained with an impregnating resin consisting of 50% to 75% by weight epoxy resin, 10% to 30% by weight of silica flour, and 8% to 20% by weight of hardener. Additional layers of impregnated fiber glass cloth can be applied, as described in the previous modification, with the bridge chaplets being secured to the last layer of the laminate 18' which is applied.

A ferrous base or semi-steel metal plate is used as the base member for the die. Adhesion of the epoxy resin to the metal plate or base member can be improved if the surface thereof is roughened by grinding, sand blasting or the like. Moreover, it is generally desirable to clean the surface of the base member with a suitable solvent, such as alcohol, to remove any oil or grease which would interfere with the adhesion of epoxy resin to the metal. The flat metal plate or boiler plate adaptor is then fitted and sealed to the upper edge of the damming with the anchors thereon depending between the damming into the casting cavity. Hemp saturated with gauging plaster can be used to seal the joint between the upper edge of the damming box and the lower surface of the boiler plate adaptor. Suitable risers or air vent boxes are then positioned around the upper periphery of the damming and the joints thereof similarly sealed with gauging plaster impregnated hemp.

After the face coat 22', the fiber glass laminate 18', and the impregnated hemp have sufficiently hardened, small stones 34 are introduced into the casting cavity formed by the damming. Suitable apertures 46 are provided in the boiler plate adaptor permitting one to introduce and distribute the stones in the casting cavity. A sufficient quantity of stones are introduced to substantially fill the casting cavity. The stones can be generally of any size, depending upon the relative dimensions of the die being formed. For example, in a die of this type having a face coat surface area of about one to two square feet, satisfactory results are obtainable using gravel having a mesh size between about ¾ inch to 1½ inches. Satisfactory larger dies have been made using gravel having a mesh size between about ¾ inch and up to about 3 inches. In most instances it is preferable to employ washed gravel to obtain a stronger bonding of epoxy resin thereto.

Subsequently, a filled epoxy resin is introduced into the casting cavity through the openings 46 in the boiler plate adaptor. Sufficient filled epoxy resin is introduced into the casting cavity until the level of the plastic rises to the lower surface 38 of the boiler plate adaptor and completely fills the casting cavity. This pouring operation should be performed slowly to allow the air to properly escape from the interstices of the stones through the air vents and base member openings 46, preventing entrapment of any substantial amount of air.

A satisfactory mixture to be employed as the filled epoxy resin for filling the interstices between the stones is one comprising about 25% to 40% by weight epoxy resin, 10% to 20% by weight of atomized aluminum or other suitable metal powder, 40% to 60% by weight of Portland cement, and 2% to 10% by weight of catalyst or hardener. Specifically, excellent results are obtained with a composition consisting of approximately 100 parts by weight of epoxy resin, 150 parts by weight of Portland cement, 50 parts by weight of atomized aluminum and about 25 parts by weight of hardener. Among the powdered metals which may be used, atomized aluminum having a mesh size of approximately 120 has been found to provide excellent results.

As discussed in the previous modification, it has been found desirable to allow the filled epoxy resin layer to cure for at least 24 hours before removing the damming and female plaster cast. With the flash being machined off in any suitable manner the composite die is then completed and ready for use. This die and the mating female die which may also be formed in the foregoing manner are then set up into assembed position for drawing operations.

Moreover, it is especially desirable to form the die shown in FIGURE 2 precisely in the manner hereinbefore described. All of the casting resin 36 which is to be used should be introduced into the casting cavity in a single pouring operation. The intense heat generated when pouring the resin in this manner contributes to a complete thermosetting of the resin to give a harder, more durable die. The sequential filling of the cavity by adding gravel, a quantity of resin, more gravel, more resin, etc., is less desirable. In addition to the possibility of non-integration of the various layers, the small amounts of resin used may not generate enough undissipated heat to fully cure it to a thermoset condition. Thus, it may be necessary to subsequently heat the die to cure the resin which may cause deleterious distortions in the die.

The epoxy resin employed in each intsance may be a condensation product of epichloro hydrin with bis-phenol or glycerol. Of course, a mixture of more than one epoxy resin may be used with the filler materials and hardeners to form the various plastic layers of the die. Various monomeric, low molecular weight diepoxides may be employed as the principal epoxy resin constituents. Among the epoxy resins which are appropriate are rigid, room-temperature hardening, thermosetting resins with 100% reactive components when formulated with their complementary hardeners. Diepoxides of this type usually are reaction products of bis-phenol $A(C_6H_4OHC(CH_3)_2C_6H_4OH$ or dimethyl dipara bis-phenol methane) and epichloro hydrin, the resultant product being the polyglycidal ether of bis-phenol A. Bakelite ERL-2794, which is currently manufactured and sold by Bakelite Company, New York, New York, is an example of an appropriate epoxy resin.

Typical hardeners which may be successfully employed are aliphatic polyamines which are especially synthesized to give the aforementioned epoxides a wide range of curing speeds, viscosity and pot life. Among the suitable polyamines are ethylene, diamine, diethylene triamine, triethylene tetramine, etc. These and various other hardeners also may be blended to obtain specific properties in the finished product. Examples of such hardener blends are those identified as BR-18793 and BR-18807 currently manufactured and sold by Bakelite Company.

The plastic material containing the Portland cement should be thoroughly mixed to uniform consistency before it is poured. When using the preferred filled epoxy resin composition set forth above, it is advantageous to mix no more than 50 pounds at one time. The cement in the mixture is preferably added to the resin slowly, small amounts at a time, to avoid forming lumps.

Dies constructed in accordance with this invention are particularly advantageous in the manufacture of relatively low-volume production stamped metal panels and the like since substantial savings in time and labor may be accomplished without reducing the quality of the finished product.

It is to be understood, that while the invention has been described with specific reference to a particular embodiment thereof it is not to be so limited since variations thereof may be made within the scope of the invention as defined by the following claims.

I claim:

1. A reinforced plastic die for stamping sheet metal panels, said die comprising a metal base member which has a surface thereof which generally corresponds to the contour of a part to be stamped with said die, a layer of filled epoxy plastic bonded to said base member, said layer being formed from a hardened mixture containing about 25% to 40% by weight of epoxy resin, 10% to 20% by weight of metal powder, 40% to 60% by weight of calcium silicate type cement and 2% to 10% by weight of hardener for said resin, a plurality of spaced anchor members extending from said base member into said layer, a fiber glass cloth laminate comprising a plurality of layers of fiber glass cloth bonded to the surface of said filled epoxy resin layer opposite said base member, said fiber glass cloth being impregnated with a hardened mixture containing about 50% to 75% by weight of epoxy resin, 10% to 30% by weight of silica flour and 8% to 20% by weight of hardener for said resin, a plurality of spaced bridge chaplets located at the interface of said layer and said laminate, and a lamellar overlay of quartz-filled epoxy resin bonded to the surface of said laminate opposite said first filled epoxy resin layer.

2. A reinforced plastic die for stamping sheet metal panels, said die comprising a substantially flat metal base member, a plurality of spaced anchor members extending therefrom, a die body portion composed of epoxy plastic and stone bonded to said base member and surrounding said anchor members which extend therefrom, said plastic being a hardened mixture containing about 25% to 40% by weight of epoxy resin, 10% to 20% by weight of metal powder, 40% to 60% by weight of calcium silicate type cement and 2% to 10% by weight of hardener for said resin, a fiber glass cloth laminate comprising a plurality of layers of fiber glass cloth bonded to the surface of said filled epoxy resin die body opposite said base member, said fiber glass cloth being impregnated with a hardened mixture containing about 50% to 75% by weight of epoxy resin, 10% to 30% by weight of silica flour and 8% to 20% by weight of hardener for said resin, a plurality of spaced bridge chaplets located at the interface of said die body and said laminate, and a lamellar overlay of quartz-filled epoxy resin bonded to the surface of said laminate opposite said first filled epoxy resin layer.

3. A reinforced plastic die for stamping sheet metal panels, said die comprising a metal base member having a surface thereof which generally corresponds to the contour of a part to be stamped with said die, a layer of filled epoxy plastic bonded to said surface of said base member, said layer being formed from a hardened mixture containing about 25% to 40% by weight of epoxy resin, 10% to 20% by weight of metal powder, 40% to 60% by weight of calcium silicate type cement and sufficient hardener for said resin, a plurality of spaced anchor members extending from said base member into said layer, a fiber glass cloth laminate comprising a plurality of layers of fiber glass cloth bonded to the surface of said filled epoxy resin layer opposite said base member, said fiber glass cloth being impregnated with a hardened mixture containing about 50% to 75% by weight of epoxy resin, 10% to 30% by weight of silica flour and sufficient hardener for said resin, a plurality of spaced bridge chaplets located at the interface of said layer and said laminate, and a lamellar overlay of quartz-filled epoxy resin bonded to the surface of said laminate opposite said first filled epoxy resin layer.

4. A reinforced plastic die for stamping sheet metal panels, said die comprising a substantially flat metal base member, a plurality of spaced anchor members extending therefrom, a die body portion composed of epoxy plastic and stone bonded to said base member and surrounding said anchor members which extend therefrom, said plastic being a hardened mixture containing about 25% to 40% by weight of epoxy resin, 10% to 20% by weight of metal powder, 40% to 60% by weight of calcium silicate type cement and sufficient hardener for said resin, a fiber glass cloth laminate comprising a plurality of layers of fiber glass cloth bonded to the surface of said filled epoxy resin die body opposite said base member, said fiber glass cloth being impregnated with a hardened mixture containing about 50% to 75% by weight of epoxy resin, 10% to 30% by weight of silica flour and sufficient hardener for said resin, a plurality of spaced bridge chaplets located at the interface of said die body and said laminate, and a lamellar overlay of quartz-filled epoxy resin bonded to the surface of said laminate opposite said first filled epoxy resin layer.

5. A reinforced plastic die for stamping sheet metal panels, said die comprising a metal base member having a surface thereof which generally corresponds to the contour of a part to be stamped with said die, a hardened plastic layer bonded to said base member, a plurality of spaced anchor members extending from said base member into said plastic layer, said layer being formed from a mixture containing approximately 25% to 40% by weight of hardenable resin, 10% to 20% by weight of a metal powder, 40% to 60% by weight of hydraulic cement and sufficient hardener for said resin, a thin layer of fiber glass cloth adhering to the surface of said filled hardened plastic layer opposite said base member, said fiber glass cloth being impregnated with a hardened mixture containing about 50% to 75% by weight of hardenable resin, 10% to 30% by weight of silica flour and sufficient hardener for said resin, a plurality of spaced bridge chaplets located at the interface of said die body and said laminate, and a lamellar overlay of filled hardened resin bonded to the surface of said laminate opposite said plastic layer.

6. A reinforced plastic die for stamping sheet metal panels, said die comprising a substantially flat metal base member, a quantity of a hardened filled resin having gravel dispersed therethrough bonded to said base member, a plurality of spaced anchor members extending from said base member into said resin, said filled resin containing approximately 25% to 40% by weight of hardenable resin, 10% to 20% by weight of a metal powder, 40% to 60% by weight of hydraulic cement and sufficient hardener for said resin, a thin layer of fiber glass cloth adhering to the surface of said hardened filled resin-stone mixture opposite said base member, said fiber glass cloth being impregnated with a hardened mixture containing about 50% to 75% by weight of epoxy resin, 10% to 30% by weight of silica flour and sufficient hardener for said resin, a plurality of spaced bridge chaplets located at the interface of said die body and said laminate, and a lamellar overlay of filled hardened resin bonded to said impregnated fiber glass cloth layer opposite said plastic layer.

References Cited in the file of this patent

UNITED STATES PATENTS

| | | |
|---|---|---|
| 405,618 | Swift | June 18, 1889 |
| 673,822 | Sagendorph | May 7, 1901 |
| 1,351,048 | Lockwood | Aug. 31, 1920 |
| 1,881,517 | Groehn | Oct. 11, 1932 |
| 1,935,885 | Meissner | Nov. 21, 1933 |
| 1,940,294 | Calkins | Dec. 19, 1933 |
| 1,947,085 | Hill et al. | Feb. 13, 1934 |
| 2,016,569 | Zinser | Oct. 8, 1935 |
| 2,325,369 | Chesney | July 27, 1943 |
| 2,347,233 | Abernathy | Apr. 25, 1944 |
| 2,413,729 | Rushmer | Jan. 7, 1947 |
| 2,478,171 | Macpherson | Aug. 9, 1949 |
| 2,492,131 | Burger et al. | Dec. 27, 1949 |
| 2,512,716 | Courtney | June 27, 1950 |
| 2,738,297 | Pfistershammer | Mar. 13, 1956 |
| 2,777,790 | Kish | Jan. 15, 1957 |
| 2,780,607 | Rappleyea | Feb. 5, 1957 |
| 2,836,530 | Rees | May 27, 1958 |
| 2,887,971 | Kalis | May 26, 1959 |
| 2,901,455 | Jurras | Aug. 25, 1959 |

OTHER REFERENCES

"Epoxy Resins," by Lee and Neville, McGraw Hill Book Company, 1957, pages 146–154.

"Tooling and Production," volume 21, No. 5, August 1955, pages 71–74.